United States Patent
Ahn

(10) Patent No.: US 8,795,864 B2
(45) Date of Patent: Aug. 5, 2014

(54) LITHIUM POLYMER BATTERY

(75) Inventor: Chang-Bum Ahn, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 109 days.

(21) Appl. No.: 13/525,515

(22) Filed: Jun. 18, 2012

(65) Prior Publication Data
US 2013/0059183 A1    Mar. 7, 2013

(30) Foreign Application Priority Data
Sep. 2, 2011   (KR) .................. 10-2011-0089206

(51) Int. Cl.
   *H01M 2/14*   (2006.01)
   *H01M 2/18*   (2006.01)
   *H01M 4/70*   (2006.01)
   *H01M 10/0587* (2010.01)

(52) U.S. Cl.
   USPC .............................. 429/94; 429/133; 429/246

(58) Field of Classification Search
   USPC .................. 429/144, 163, 246, 94, 133
   See application file for complete search history.

(56) References Cited

U.S. PATENT DOCUMENTS

2006/0008698 A1*   1/2006   Kim et al. ................... 429/48
2011/0129707 A1    6/2011   Ahn et al.
2011/0129722 A1*   6/2011   Yoneda .................... 429/162
2011/0143181 A1    6/2011   Ahn
2012/0196167 A1    8/2012   Kim et al.

FOREIGN PATENT DOCUMENTS

| JP | 2001-110453 | | 4/2001 |
| JP | 2008077846 A | * | 4/2008 |
| JP | 2009-245839 | | 10/2009 |
| KR | 10-2009-0064757 | | 6/2009 |
| KR | 1020110037781 | | 4/2011 |
| KR | 1020110059283 | | 6/2011 |
| WO | WO 2011043587 A2 | * | 4/2011 |

OTHER PUBLICATIONS

Korean Office Action dated Mar. 27, 2013 issued by KIPO in connection with Korean Patent Application 10-2011-0089206 with Request for the Entry of the accompanying Office Action.

* cited by examiner

*Primary Examiner* — Gregg Cantelmo
(74) *Attorney, Agent, or Firm* — Robert E. Bushnell, Esq.

(57) ABSTRACT

A lithium polymer battery including: an electrode assembly including: a first electrode plate including a first electrode current collector electrically connected to a first electrode tab and a first electrode active material layer formed on at least one surface of the first electrode current collector, a second electrode plate including a second electrode current collector that is electrically connected to a second electrode tab and a second active material layer formed on at least one surface of the second electrode current collector, and a separator interposed between the first electrode plate and the second electrode plate; and a case for housing the electrode assembly, wherein the separator is attached to a portion of a first electrode uncoated area of a first electrode uncoated area of the first electrode current collector to prevent a short between the first electrode plate and the second electrode plate.

22 Claims, 6 Drawing Sheets

FIG. 4
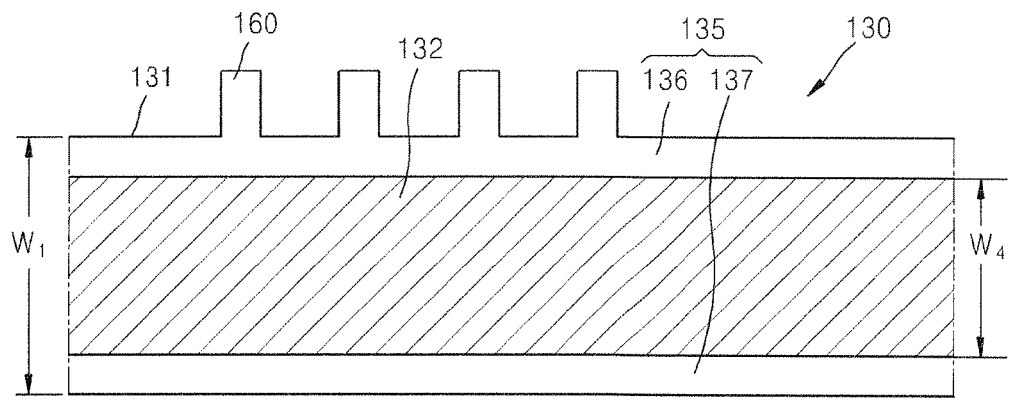
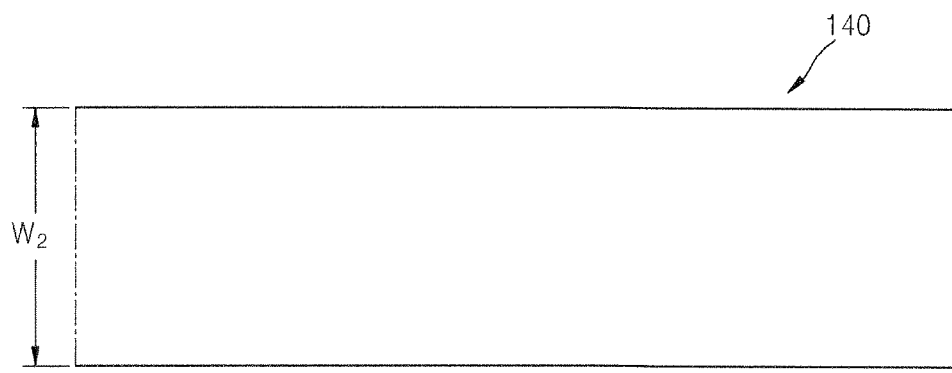
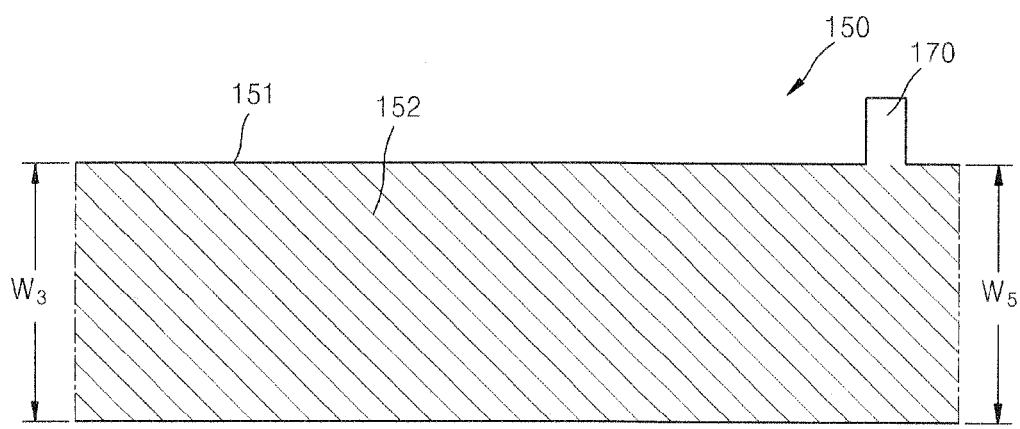

LITHIUM POLYMER BATTERY

CLAIM OF PRIORITY

This application makes reference to, incorporates the same herein, and claims all benefits accruing under 35 U.S.C. §119 from an application earlier filed in the Korean Intellectual Property Office on 2 Sep. 2011 and there duly assigned Serial No. 10-2011-0089206.

BACKGROUND OF THE INVENTION

1. Field of the Invention

The present invention generally relates to lithium polymer batteries.

2. Description of the Related Art

Typically, unlike primary batteries that are not rechargeable, secondary batteries are rechargeable. Secondary batteries are used as energy sources for small mobile display devices, such as a smart phone, a digital camera, a video camera, a camcorder, a portable information terminal device, a tablet personal computer, or a super-slim notebook computer, or middle- and large-sized devices, such as an electric vehicle, a hybrid electric vehicle, an electric bicycle, or an uninterruptible power supply (UPS).

Small mobile display devices use a small number of battery cells. Also, middle- and large-sized devices require high power output and large capacities, and thus, they use a battery pack in which a plurality of battery cells are electrically connected to each other.

The battery cells are connected in series or parallel and are placed in a battery unit. A plurality of the battery units are connected to each other to form a battery module. A plurality of the battery modules are connected to each other to form a battery pack to provide high power output and capacitance.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include lithium polymer batteries that prevent an electrical short between a positive electrode plate and a negative electrode plate to improve stability of the batteries.

Additional aspects will be set forth in area in the description which follows and, in part, will be apparent from the description, or may be learned by practice of the presented embodiments.

According to one or more embodiments of the present invention, a lithium polymer battery includes: an electrode assembly that includes: a first electrode plate including a first electrode current collector that is electrically connected to a first electrode tab and a first electrode active material layer that is formed on at least one surface of the first electrode current collector, a second electrode plate including a second electrode current collector that is electrically connected to a second electrode tab and a second active material layer that is formed on at least one surface of the second electrode current collector, and a separator that is interposed between the first electrode plate and the second electrode plate; and a case for housing the electrode assembly, wherein the separator is attached to a portion of a first electrode uncoated area of the first electrode current collector.

According to an embodiment of the present invention, the first electrode active material layer is formed along a lengthwise direction of the first electrode current collector, the first electrode uncoated area corresponds to an area of the first electrode current collector on which the first electrode active material layer is not formed, and the first electrode uncoated area extends in a width direction of the first electrode current collector between an edge of the first electrode active material layer and an edge of the first electrode current collector, and the separator is attached to the first electrode uncoated area.

According to an embodiment of the present invention, the first electrode uncoated area is formed on at least one of an upper area of the first electrode current collector and a lower area of the first electrode current collector.

According to an embodiment of the present invention, the separator is fused on the first electrode uncoated area, wherein the separator and the second electrode plate are aligned separated.

According to an embodiment of the present invention, the separator forms a plurality of fusing spots that are spaced each other on the first electrode uncoated area in the lengthwise direction of the first electrode current collector.

According to an embodiment of the present invention, an adhesive layer may be further formed on a portion of at least one surface of the separator that corresponds to the first electrode uncoated area, and the adhesive layer is attached to the first electrode uncoated area.

According to an embodiment of the present invention, the separator may be attached to the first electrode current collector by pressing and the separator is attached to the second electrode plate by surface adherence.

According to an embodiment of the present invention, a width of the first electrode current collector may be identical to a width of the second electrode current collector.

According to an embodiment of the present invention, a width of the separator may be identical to or greater than the widths of the first electrode current collector and the second electrode current collector.

According to an embodiment of the present invention, a width of the second electrode active material layer may be greater than a width of the first electrode active material layer.

According to an embodiment of the present invention, the width of the first electrode active material layer may be smaller than the width of the first electrode current collector and the width of the second electrode active material layer may be identical to the width of the second electrode current collector.

According to an embodiment of the present invention, a plurality of the first electrode tabs may be formed in the lengthwise direction of the first electrode current collector.

According to an embodiment of the present invention, the first electrode tabs may protrude from a portion of an edge of the first electrode current collector and are integrally formed as one body with the first electrode current collector.

According to an embodiment of the present invention, the first electrode tabs are spaced apart from each other from where winding of the first electrode plate begins.

According to an embodiment of the present invention, one first electrode lead may be electrically connected to the first electrode tabs.

According to an embodiment of the present invention, one second electrode tab may protrude from the second electrode current collector in a lengthwise direction of the second electrode current collector.

According to an embodiment of the present invention, the second electrode tab may protrude from an upper portion of an edge of the second electrode current collector and is integrally formed as one body with the second electrode current collector.

According to an embodiment of the present invention, the second electrode tab may be located where winding of the second electrode plate finishes.

According to an embodiment of the present invention, one second electrode lead may be electrically connected to the second electrode tab.

According to an embodiment of the present invention, the first electrode tab may be located on an inner layer of the electrode assembly when the electrode assembly is wound, and the second electrode tab may be located on an outer layer of the wound electrode assembly.

According to an embodiment of the present invention, the first electrode tab and second electrode tab may be all located on an inner layer of the electrode assembly.

According to an embodiment of the present invention, the first electrode lead may be electrically connected to the first electrode tab and the second electrode lead may be electrically connected to the second electrode tab.

According to an embodiment of the present invention, an insulating tape for an electrode is wound on at least one of an outer surface of the first electrode lead and an outer surface of the second electrode lead that corresponds to a sealing surface of the case.

According to an embodiment of the present invention, the first electrode plate, the separator, and the second electrode plate may be wound in a jelly-roll shape.

According to an embodiment of the present invention, the first electrode plate may be a positive electrode plate and the second electrode plate is a negative electrode plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 is a plan view of the electrode assembly illustrated in FIG. 2;

DETAILED DESCRIPTION OF THE INVENTION

Figure 1:
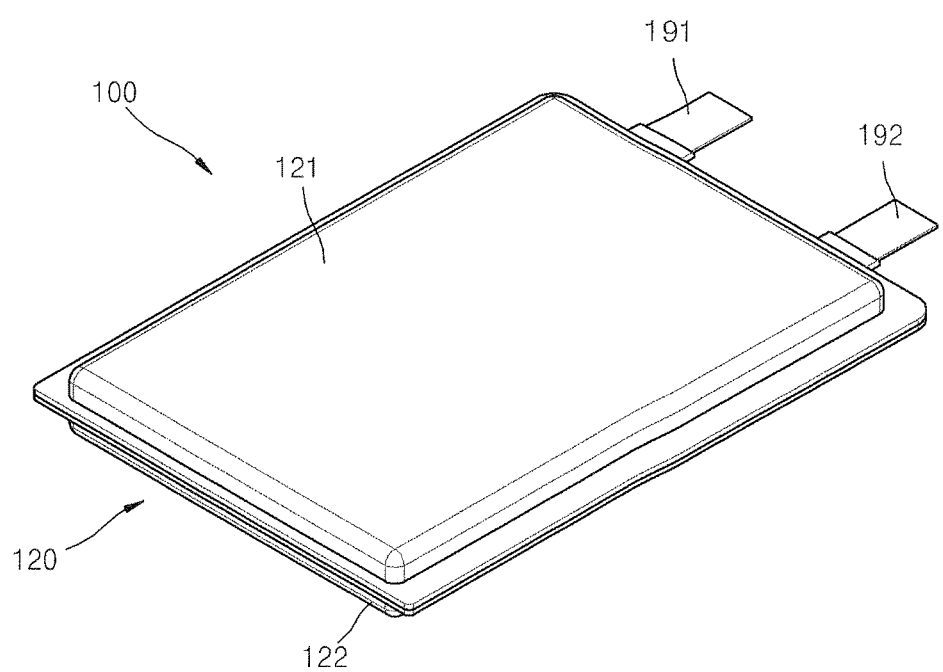
FIG. 1 is a perspective view of a lithium polymer battery according to an embodiment of the present invention.

The present invention may be variously modified and may have various embodiments. Particular embodiments of the present invention will be illustrated in the drawings and will be described in detail in the Detailed Description of the Invention section. However, the present invention is not limited to the particular embodiments and may be understood that the present invention includes any modification, equivalents, or alternatives that are included in the scope of the present invention. During description of the present invention, if it is considered that a detailed description about related disclosed art makes the present invention unclear, it will not be presented herein.

It will also be understood that, although the terms 'first, second, etc.' may be used herein to describe various elements, these elements should not be limited by these terms. These terms are only used to distinguish one element from another.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated elements, steps, operations, and/or devices, but do not preclude the presence or addition of one or more other elements, steps, operations, and/or devices.

Expressions such as "at least one of," when preceding a list of elements, modify the entire list of elements and do not modify the individual elements of the list.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Hereinafter, exemplary embodiments of the present invention will be provided with reference to the attached drawings in detail.

Figure 2:
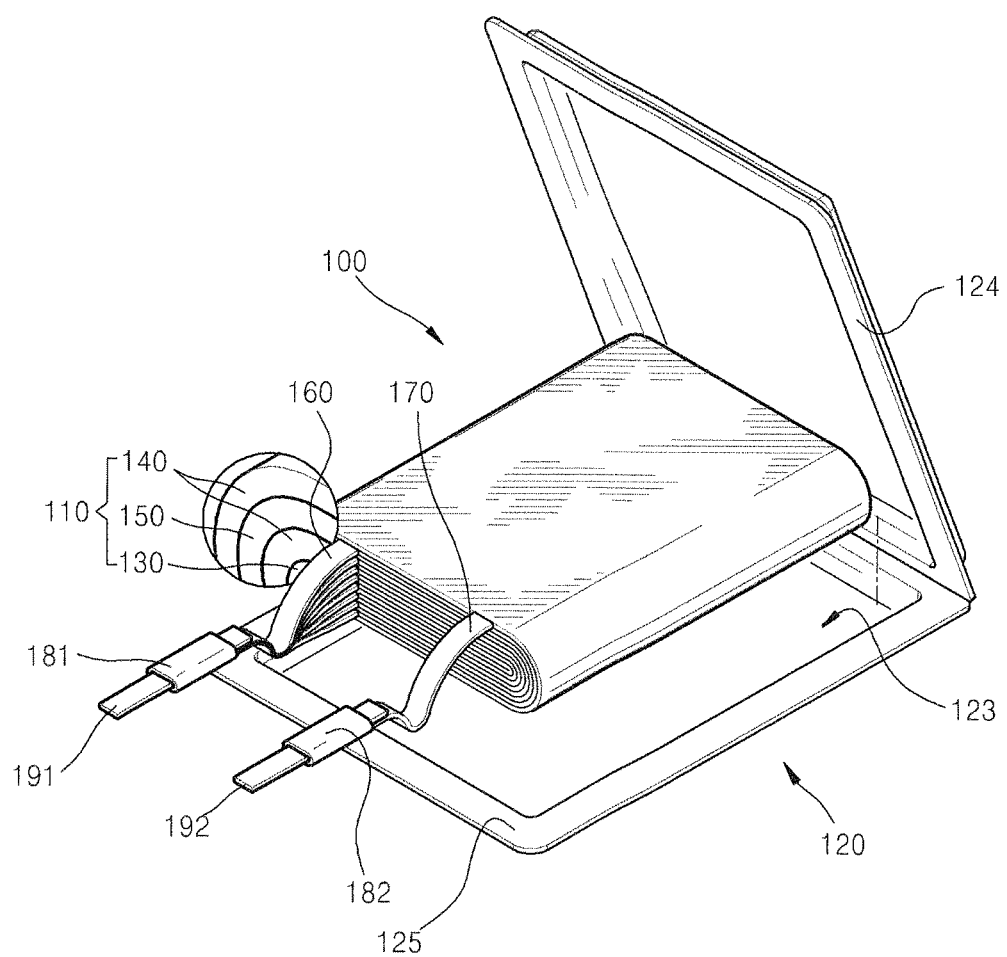
FIG. 2 is an exploded perspective view of the lithium polymer battery of FIG. 1.
Figure 3:
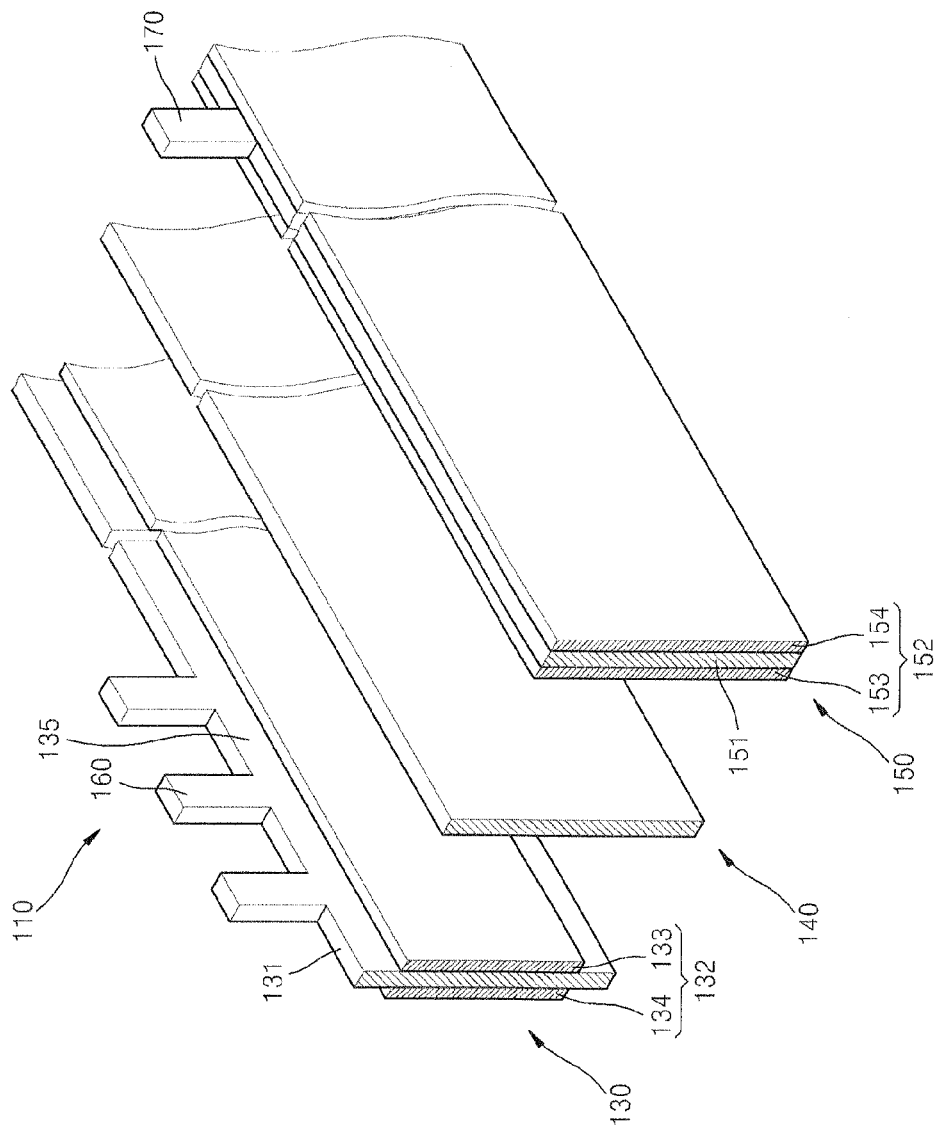
FIG. 3 is an exploded perspective view of a portion of an electrode assembly illustrated in FIG. 2.
Figure 5:
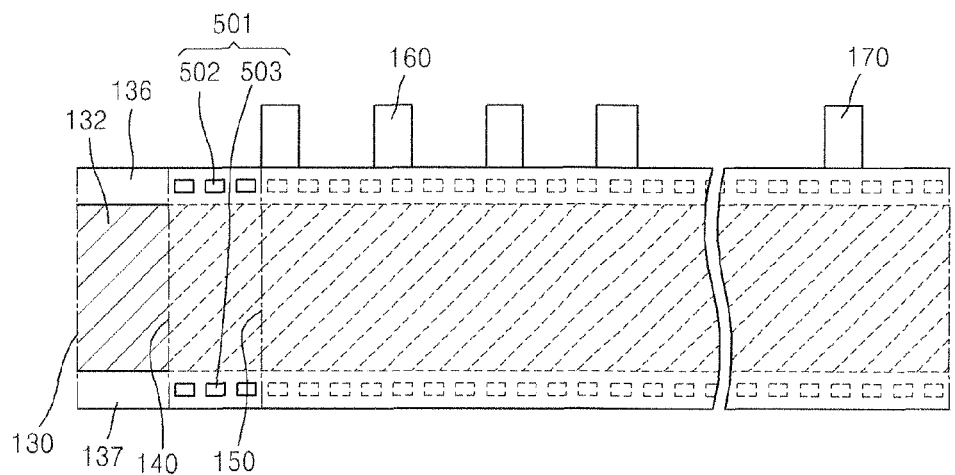
FIG. 5 is a plan view illustrating an assembled state of the electrode assembly of FIG. 4, according to an embodiment of the present invention.

FIG. 1 is a perspective view of a lithium polymer battery 100 according to an embodiment of the present invention. FIG. 2 is an exploded perspective view of the lithium polymer battery 100 of FIG. 1. FIG. 3 is an exploded perspective view of a portion of an electrode assembly 110 illustrated in FIG. 2. FIG. 4 is a plan view of an electrode assembly 110 illustrated in FIG. 2. FIG. 5 is a plan view illustrating an assembled state of the electrode assembly 110 of FIG. 4, according to an embodiment of the present invention.

Referring to FIGS. 1 to 5, the lithium polymer battery 100 includes the electrode assembly 110 and a case 120 that houses the electrode assembly 110. The electrode assembly 110 may include a positive electrode plate 130, a negative electrode plate 150, and separator 140 interposed between the positive electrode plate 130 and negative electrode plate 150.

The positive electrode plate 130 may include a positive electrode current collector 131 and a positive active material layer 132 that is formed on at least one surface of the positive electrode current collector 131. The positive electrode current collector 131 may be electrically connected to a positive electrode tab 160. The positive electrode tab 160 may be electrically connected to a positive electrode lead 191. A positive electrode insulating tape 181 may be wound on an outer surface of the positive electrode lead 191.

The negative electrode plate 150 may include negative electrode current collector 151 and a negative active material layer 152 that is formed on at least one surface of the negative electrode current collector 151. The negative electrode current collector 151 may be electrically connected to a negative electrode tab 170. The negative electrode tab 170 may be electrically connected to negative electrode lead 192. A negative electrode insulating tape 182 may be wound on an outer surface of the electrode lead 192

The separator 140 may be interposed between the positive electrode plate 130 and the negative electrode plate 150 to insulate the positive electrode plate 130 from the negative electrode plate 150.

The positive electrode plate 130, the separator 140, and the negative electrode plate 150 may be wound in a jelly-roll shape.

The case 120 may be a pouch-shape case having a flexible structure. The case 120 may include an upper case 121 and a lower case 122 that is coupled to the upper case 121. At least a portion of an edge of the upper case 121 may be integrally formed with at least a portion of the lower case 122. The case 120 may have a multi-layered structure including a metallic foil and insulating films stacked on opposite surfaces of the metallic foil, but is not limited thereto.

The electrode assembly 110 may be housed in a space 123 formed inside the case 120. Along a circumference of the space 123, an upper sealing surface 124 may be formed on the upper case 121 and a lower sealing surface 125 is formed on the lower case 122. The upper sealing surface 124 and the lower sealing surface 125 may be thermally fused to each other to seal the electrode assembly 110 after the electrode assembly 110 is housed in the space 123.

In this case, the separator 140 may be attached to a positive electrode uncoated area 135 to prevent an electrical short between the positive electrode plate 130 and the negative electrode plate 150.

The lithium polymer battery 100 will now be described in more detail.

The positive active material layer 132 may include a first positive active material layer 133 formed on a first surface of the positive electrode current collector 131 and a second positive active material layer 134 on a second surface of the positive electrode current collector 131. The positive active material layer 132 may mainly include a lithium-based oxide.

The positive active material layer 132 may be formed along a lengthwise direction of the positive electrode current collector 131. The first positive active material layer 133 may be continuously applied on the first surface of the positive electrode current collector 131 and the second positive active material layer 134 may be continuously applied on the second surface of the positive electrode current collector 131.

In this case, the positive active material layer 132 is not formed on the whole area of the positive electrode current collector 131. Specifically, the positive active material layer 132 may not be formed on an upper area 136 and a lower area 137 which are aligned in a width direction of the positive electrode current collector 131.

A positive electrode uncoated area 135 refers to an area that is not coated with the positive active material layer 132. The positive electrode uncoated area 135 is an area that is located between an edge of the positive active material layer 132 and an edge of the positive electrode current collector 131 in the width direction of the positive electrode current collector 131. The positive electrode uncoated area 135 may be formed along the lengthwise direction of the positive electrode current collector 131 on the upper area 136 or the lower area 137 of the positive electrode current collector 131. In this embodiment, the positive electrode uncoated area 135 may be formed on each of the upper area 136 and the lower area 137 of the positive electrode current collector 131.

The positive electrode tab 160 may be formed on the positive electrode current collector 131. The positive electrode tab 160 may protrude from an upper portion of the edge of the positive electrode current collector 131. The positive electrode tab 160 may be present in plurality and the positive electrode tabs 160 may be aligned in the lengthwise direction of the positive electrode current collector 131. The positive electrode tabs 160 may be formed spaced apart from each other from where winding of the positive electrode plate 130 begins. However, the positive electrode tab 160 may not be limited thereto.

The positive electrode tabs 160 may be integrally formed as one body with the positive electrode current collector 131 and may extend from the positive electrode current collector 131. The positive electrode tabs 160 may be formed simultaneously with the positive electrode current collector 131 when a material for forming the positive electrode current collector 131 is cut to form the positive electrode current collector 131.

Alternatively, the positive electrode tabs 160 may be separately manufactured and then, attached to the positive electrode uncoated area 135. The structure of the positive electrode tab 160 may not be limited as long as the positive electrode tab 160 is electrically connected to the positive electrode current collector 131.

In this regard, the positive electrode current collector 131 and the positive electrode tab 160 may each include a metallic plate with excellent conductivity, such as an aluminum plate.

The positive electrode tabs 160 may be streamlined to maximize an energy density per unit area in the space 123 of the case 120 and may be electrically connected to the positive electrode lead 191. The positive electrode lead 191 may be formed of a material that is substantially used to form the positive electrode tab 160.

The separator 140 may be interposed between the positive electrode plate 130 and the negative electrode plate 150 to insulate the positive electrode plate 130 and the negative electrode plate 150. The separator 140 may be formed of polyethylene, polypropylene, or a composite film including polyethylene and polypropylene.

The negative active material layer 152 may include a first negative active material layer 153 formed on a first surface of the negative electrode current collector 151 and a second negative active material layer 154 formed on a second surface of the negative electrode current collector 151. The negative active material layer 152 may mainly include graphite or a lithium titanium oxide (LTO).

The negative active material layer 152 may be formed in a lengthwise direction of the negative electrode current collector 151. The first negative active material layer 153 may be continuously applied on the first surface of the negative electrode current collector 151 and the second negative active material layer 154 may be continuously applied on the second surface of the negative electrode current collector 151. In this case, unlike the positive active material layer 132, the negative active material layer 152 may be formed on a whole area of the negative electrode current collector 151.

The negative electrode tab 170 may be formed on the negative electrode current collector 151. The negative electrode tab 170 may protrude from an upper portion of an edge of the negative electrode current collector 151. The protruding direction of the negative electrode tab 170 may be the same as the protruding direction of the positive electrode tab 160, but the protruding directions may not be limited thereto.

Herein, only one negative electrode tab 170 is formed along the lengthwise direction of the negative electrode current collector 151. One negative electrode tab 170 may be formed where the winding of the negative electrode plate 150 finishes, but the location of the negative electrode tab 170 is not limited thereto.

The negative electrode tab 170 may be integrally formed as one body with the negative electrode current collector 151 and may protrude from the negative electrode current collector 151. The negative electrode tab 170 may be formed simultaneously with the negative electrode current collector 151 when a material for forming the negative electrode current collector 151 is cut to form the negative electrode current collector 151.

Alternatively, the negative electrode tab 170 may be separately manufactured and then attached to the negative electrode current collector 151. The structure of the negative electrode tab 170 may not be limited as long as the negative electrode tab 170 is electrically connected to the negative electrode current collector 151.

In this regard, the negative electrode current collector 151 and the negative electrode tab 170 may each include a metallic plate with excellent conductivity, such as a copper plate.

The negative electrode tab 170 may be streamlined and electrically connected to the negative electrode lead 192. The negative electrode lead 192 may include a copper plate and a nickel plating layer formed on the copper plate. In the case of small secondary batteries, a nickel plate is used as a negative electrode lead. However, in the case of middle- and large-sized batteries, if the nickel plate is used as a negative electrode lead, resistance of the negative electrode plate 150 increases. Accordingly, typically, to reduce the resistance, a copper plate having opposite sides each plated with a nickel plating layer is used to reduce the resistance.

However, due to the copper plate having opposite sides each plated with a nickel plating layer as the negative electrode lead 192, a resistance of the positive electrode plate 130 increases and thus, heat may be generated.

Accordingly, to distribute the local resistance of the positive electrode plate 130, a plurality of positive electrode tabs 160 are used as described above instead of one positive electrode tab 160. On the other hand, because the negative electrode plate 150 generates heat less than the positive electrode plate 130, only one negative electrode tab 170 may be appropriate for use.

In this case, a width of the positive electrode plate 130 may be substantially identical to a width of the negative electrode plate 150.

That is, a width W1 of the positive electrode current collector 131 may be identical to a width W3 of the negative electrode current collector 151. Due to the same widths of the positive electrode current collector 131 and the negative electrode current collector 151, an align process may be further easily performed when the positive electrode plate 130 and the negative electrode plate 150 are manufactured. Also, a width W2 of the separator 150 may be identical to or greater than the width W1 of the positive electrode current collector 131 and the width W3 of the negative electrode current collector 151.

A width W5 of the negative active material layer 152 may be greater than a width W4 of the positive active material layer 132. For example, the width W4 of the positive active material layer 132 may be smaller than the width W1 of the positive electrode current collector 131, and the width W5 of the negative active material layer 152 may be identical to the width W3 of the negative electrode current collector 151.

That is, the positive active material layer 132 may not be formed on the whole area of the positive electrode current collector 131. In detail, the positive active material layer 132 may not be formed on the upper area 136 and the lower area 137 of the positive electrode current collector 131 in a width direction thereof, and the upper area 136 and the lower area 137 constitute the positive electrode uncoated area 135 that is an area on which the positive active material layer 132 is not coated. On the other hand, the negative active material layer 152 may be formed on the whole area of the negative electrode current collector 151. Accordingly, a coating amount of the negative active material layer 152 may be greater than that of the positive active material layer 132.

When the negative active material layer 152 mainly includes graphite, the area of the negative active material layer 152 may be larger than that of the positive active material layer 132. However, when the negative active material layer 152 mainly may include lithium titanium oxide, the area of the positive active material layer 132 may be larger than that of the negative active material layer 152.

Also, the separator 140 may be attached on the positive electrode uncoated area 135. The separator 140 may be attached to the positive electrode plate 130 that generates more heat than the negative electrode plate 150. For example, the separator 140 may be attached to at least one of the upper area 136 and the lower area 137 of the positive electrode current collector 131 which are areas not coated with the positive active material layer 132 by fusing.

In the lengthwise direction of the positive electrode current collector 131, upper fusing spots 502 may be formed on the upper area 136 of the positive electrode current collector 131 by fusing the separator 140 in such a way that the upper fusing spots 502 are spaced apart from each other by a predetermined distance, and lower fusing spots 503 are formed on the lower area 137 of the positive electrode current collector 131 by fusing the separator 140 in such a way that the lower fusing spots 503 are spaced apart from each other by a predetermined distance.

A fusing spot 501 may include the upper fusing spot 502 and the lower fusing spot 503 may be formed by ultrasonic wave fusing or thermal fusing. Unlike the present embodiment in which the fusing spot 501 may be formed spaced apart from each other by a predetermined distance in the lengthwise direction of the positive electrode current collector 131, the fusing spot 501 may be continuously formed in the lengthwise direction of the positive electrode current collector 131.

Also, the separator 140 may not be fixed on the negative electrode plate 150. That is, the separator 140 and the negative electrode plate 150 are aligned separated from each other.

To form the electrode assembly 110, the positive electrode plate 130, the separator 140, and the negative electrode plate 150 are assembled by being aligned in this stated order and wound in a jelly-roll shape.

After assembly, during operation of the secondary battery 100, the separator 140 may shrunk due to deformation of the electrode assembly 110, because the separator 140 is fixed on the upper area 136 and the lower area 137 of the positive electrode current collector 131, an electrical short between the positive active material layer 132 and the negative active material layer 152 that occurs due to the contact therebetween may be preventable.

Figure 6:
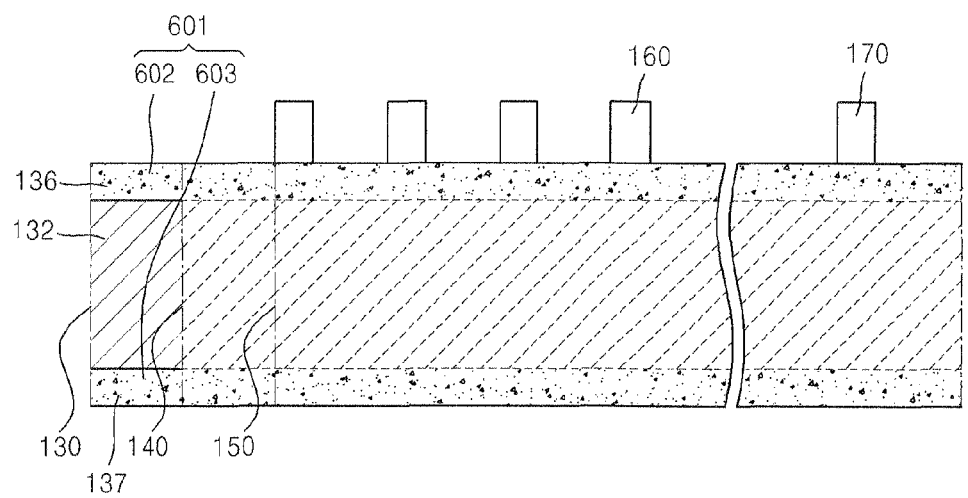
FIG. 6 is a plan view illustrating an assembled state of the electrode assembly of FIG. 4, according to another embodiment of the present invention.

Alternatively, as illustrated in FIG. 6, the separator 140 may be attached to the positive electrode uncoated area 135 by adherence.

That is, an adhesive layer may be formed on at least one surface of the separator 140 by using a polyfluorovinylidene (PVDF) or acryl-based binder, and then attached to the at least one of the upper area 136 and the lower area 137 of the positive electrode current collector 131.

In the lengthwise direction of the positive electrode current collector 131, the separator 140 may form an upper adherence portion 602 on the upper area 136 of the positive electrode current collector 131 and may form a lower adherence portion 603 on the lower area 137. Like this, an adherence portion 601 including the upper adherence portion 602 and the lower adherence portion 603 may be formed by the adhesive layer formed on the surface of the separator 150.

If the adhesive layer is further formed on a surface of the separator 140 that is opposite to the surface described above and faces the negative electrode plate 150, the separator 140 is also attachable to the negative electrode plate 150.

In this case, the adherence of the separator 140 with respect to the positive electrode current collector 131 is performed by applying such a pressure that the separator 140 is not released from the electrode assembly 110. However, the adherence of the separator 140 with respect to the negative electrode plate 150 is a simply mechanical adherence.

Also, in the case that the electrode assembly 110 is wound in a jelly-roll shape, because a plurality of positive electrode tabs 160 are spaced apart from each other by a predetermined distance from where the winding of the positive electrode plate 130 begins and extend from the positive electrode current collector 131 and one negative electrode tab 170 is formed where the winding of the negative electrode plate 150 finishes, a plurality of positive electrode tabs 160 may be aligned on an inner layer of the electrode assembly 110 and one negative electrode tab 170 may be aligned on an outer layer of the electrode assembly 110.

Figure 7:
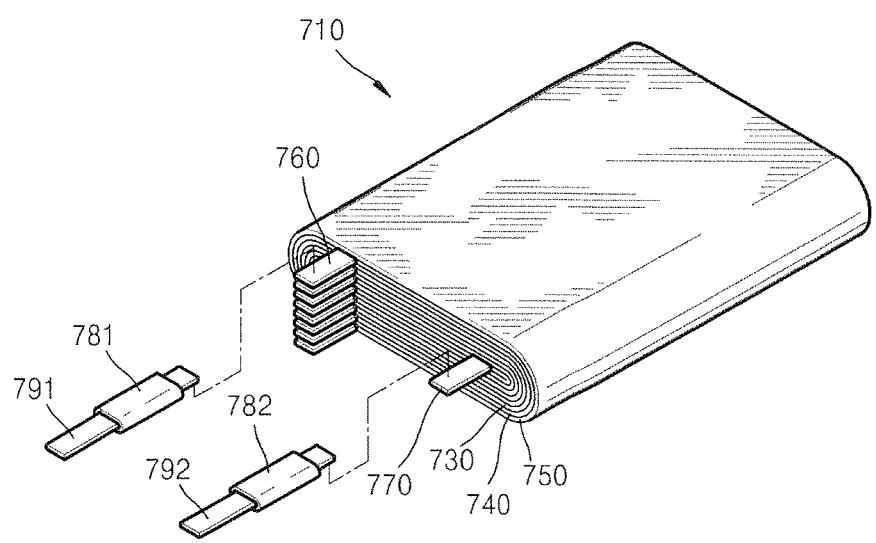
FIG. 7 is a perspective view of an electrode assembly according to an embodiment of the present invention.

Alternatively, as illustrated in FIG. 7, regarding an electrode assembly 710, when the positive electrode plate 730, the separator 740, and the negative electrode plate 750 may be wound in this stated order, a plurality of positive electrode tabs 760 extending from the positive electrode plate 730 and one negative electrode tab 770 extending from the negative electrode plate 750 may all be located on the inner layer of the electrode assembly 710.

The positive electrode tabs 760 are gathered and electrically connected to a positive electrode lead 791 and the positive electrode insulating tape 781 is wound on an outer surface of the positive electrode lead 791. One negative electrode tab 770 is electrically connected, to the negative electrode lead 792 and the negative electrode insulating tape 782 is wound on an outer surface of a negative electrode lead 792.

As described above, regarding the lithium polymer batteries according to the above embodiments of the present invention, a short between a first electrode plate and a second electrode plate may be preventable by attaching a separator to a first electrode uncoated area of the first electrode plate. Also, due to the formation of just one second electrode tab of the second electrode plate that generates heat less than the first electrode plate, a short between the first electrode plate and the second electrode plate that may occur at high temperatures when mechanical impacts are applied thereto may also be preventable.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A lithium battery comprising:
an electrode assembly comprising:
a first electrode plate comprising a first electrode current collector that is electrically connected to a plurality of first electrode tabs and a first electrode active material layer that is formed on at least one surface of the first electrode current collector,
a second electrode plate comprising a second electrode current collector that is electrically connected to one second electrode tab and a second active material layer that is formed on at least one surface of the second electrode current collector, and
a separator that is interposed between the first electrode plate and the second electrode plate; and
a case for housing the electrode assembly,
wherein the separator is attached to a portion of a first electrode uncoated area of the first electrode current collector.

2. The lithium battery of claim 1, wherein the first electrode active material layer is formed along a lengthwise direction of the first electrode current collector,
the first electrode uncoated area corresponds to an area of the first electrode current collector on which the first electrode active material layer is not formed, and the first electrode uncoated area extends in a width direction of the first electrode current collector between an edge of the first electrode active material layer and an edge of the first electrode current collector, and
the separator is attached to the first electrode uncoated area.

3. The lithium battery of claim 2, wherein the first electrode uncoated area is formed on at least one of an upper area of the first electrode current collector and a lower area of the first electrode current collector.

4. The lithium battery of claim 2, wherein the separator is fused on the first electrode uncoated area,
wherein the separator and the second electrode plate are aligned separated.

5. The lithium battery of claim 4, wherein the separator forms a plurality of fusing spots that are spaced each other on the first electrode uncoated area in the lengthwise direction of the first electrode current collector.

6. The lithium battery of claim 2, wherein an adhesive layer is further formed on a portion of at least one surface of the separator that corresponds to the first electrode uncoated area, and the adhesive layer is attached to the first electrode uncoated area.

7. The lithium battery of claim 6, wherein the separator is attached to the first electrode uncoated area by pressing and the separator attached to the second electrode plate by surface adherence.

8. The lithium battery of claim 1, wherein a width of the first electrode current collector is identical to a width of the second electrode current collector.

9. The lithium battery of claim 8, wherein a width of the second electrode active material layer is greater than a width of the first electrode active material layer.

10. The lithium battery of claim 9, wherein the width of the first electrode active material layer is smaller than the width of the first electrode current collector and the width of the second electrode active material layer is identical to the width of the second electrode current collector.

11. The lithium battery of claim 1, wherein the plurality first electrode tabs are formed in the lengthwise direction of the first electrode current collector, and wherein the one second electrode tab protrudes from the second electrode current collector in a lengthwise direction of the second electrode current collector.

12. The lithium battery of claim 11, wherein the first electrode tabs protrude from a portion of an edge of the first electrode current collector and are integrally formed as one body with the first electrode current collector, and wherein the second electrode tab protrudes from an upper portion of an edge of the second electrode current collector and is integrally formed as one body with the second electrode current collector.

13. The lithium battery of claim 11, wherein the first electrode tabs are spaced apart from each other from where winding of the first electrode plate begins, and wherein the second electrode tab is located where winding of the second electrode plate finishes.

14. The lithium battery of claim 11, wherein one first electrode lead is electrically connected to the first electrode tabs, and wherein one second electrode lead is electrically connected to the second electrode tab.

15. The lithium battery of claim 14, wherein each of the first electrode lead and the first electrode tabs comprises an aluminum plate wherein the second electrode tab comprises a copperplate, and the second electrode lead comprises a copper plate and a nickel plating layer formed on the copper plate.

16. The lithium battery of claim 11, wherein the protruding direction of the second electrode tab is identical to the protruding direction of the first electrode tab.

17. The lithium battery of claim 1, wherein the plurality of first electrode tabs is located on an inner layer of the electrode assembly when the electrode assembly is wound, and the second electrode tab is located on an outer layer of the wound electrode assembly.

18. The lithium battery of claim 1, wherein the plurality of first electrode tabs and the second electrode tab are all located on an inner layer of the electrode assembly.

19. The lithium battery of claim 1, wherein an insulating tape for an electrode is wound on at least one of an outer surface of the first electrode lead and an outer surface of the second electrode lead that corresponds to a sealing surface of the case.

20. The lithium battery of claim 1, wherein the first electrode plate, the separator, and the second electrode plate are wound in a jelly-roll shape.

21. The lithium battery of claim 1, wherein the first electrode plate is a positive electrode plate and the second electrode plate is a negative electrode plate.

22. The lithium battery of claim 21, wherein an area of the negative active material layer is identical to an area of separator or a whole area of the positive electrode plate.

* * * * *